Figure 1:
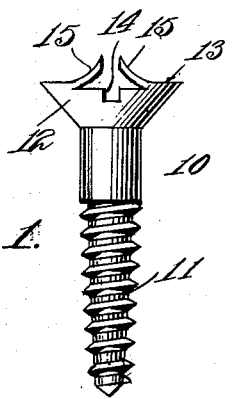

March 4, 1930.  J. NEISER  1,749,043
SCREW
Filed Feb. 27, 1929

WITNESSES
F. H. Taylor
Harry E. Seidel

INVENTOR
J. Neiser
BY
ATTORNEY

Patented Mar. 4, 1930

1,749,043

UNITED STATES PATENT OFFICE

JOSEPH NEISER, OF LONDON, OHIO

SCREW

Application filed February 27, 1929. Serial No. 343,055.

This invention relates to screws.

An object of the invention is the provision of a screw or bolt having a slot in the head for the reception of a screw driver or some suitable tool whereby the screw may be rotated and forced into a board, lips being formed adjacent the slot through which the tool is inserted so that when the screw is forced into operative position the said wings may be swaged over the slot to eliminate all traces of the slot and prevent removal of the screw.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figure 2:
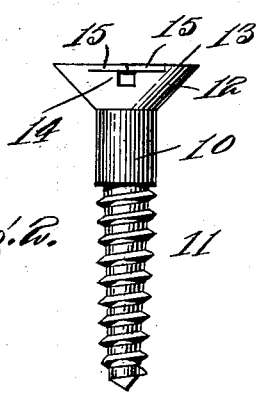
Figure 3:
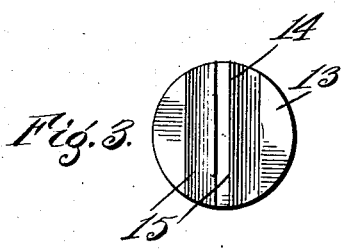
Figure 4:

In the drawings:

Figure 1 is a view in elevation of a screw constructed in accordance with the principles of my invention, Figure 2 is a view in elevation of the screw shown in Figure 1 with the slot sealed, Figure 3 is a plan view of the screw shown in Figure 1, Figure 4 is a plan view of the screw having a sealed slot illustrated by Figure 2.

Referring more particularly to the drawings, 10 designates a screw having threads 11 by which the screw is driven into a piece of wood and secured thereby for the purpose of securing a hinge or other exposed element to a door or wall.

A frusto-conically shaped head 12 is formed at the upper end of the shank of the screw. The outer surface of the head is flat as shown at 13 and a slot 14 extends diametrically of the head to receive a screw driver or some suitable tool for the purpose of rotating and driving the screw into a fixed support.

Flanges or wings 15 formed integrally with the head 12 and extending the entire width of said head project upwardly and have their free ends spaced from each other above the slot 14 to permit the insertion of a suitable tool. After the screw has been forced into place a hammer or any well known device for the purpose is employed for forcing the wings inwardly and in closing relation with the slot 14 for sealing said slot and preventing an unauthorized person from readily removing the screw by the insertion of the screw driver in the slot. In this position the outer surfaces of the wings lie flush with the flat surface 13 of the head.

This type of screw is particularly efficient in those cases where screws must be exposed and whereby they may be readily removed by a screw driver. The swaging of the wings over the slot 14 in Figure 1 will prevent ready removal of the screw unless special equipment were employed for the purpose.

I claim:—

1. A screw having a head and a threaded shank depending from said head, the head having means projecting from the outer surface thereof and a slot embraced by the projecting means, said projecting means being adapted to be formed into a smooth surface to close the slot aganst unauthorized manipulation of the screw.

2. A screw having a head and a threaded shank depending from said head, the outer surface of the head being flat and provided with a slot, wings projecting from the flat surface upon opposite sides of the slot, said wings being adapted to be swaged over the slot after the screw has been forced into a fixed support.

3. A screw having a head and a threaded shank dependng from said head, the outer surface of the head being flat and provided with a slot, wings projecting from the flat surface upon opposite sides of the slot, said wings being adapted to be formed into a smooth surface to close said slot against unauthorized manipulation of the screw.

Signed at London, in the county of Madison and State of Ohio this 4th day of February, A. D. 1929.

JOSEPH NEISER.